United States Patent
Furukawa et al.

[11] Patent Number: 5,337,319
[45] Date of Patent: Aug. 9, 1994

[54] APPARATUS AND METHOD FOR RECONFIGURING AN IMAGE PROCESSING SYSTEM TO BYPASS HARDWARE

[75] Inventors: Shigehiro Furukawa; Kazuo Hayashi; Hiroshi Takayanagi, all of Kanagawa, Japan

[73] Assignee: Fuji Xerox Co., Ltd., Tokyo, Japan

[21] Appl. No.: 595,224

[22] Filed: Oct. 10, 1990

[51] Int. Cl.⁵ .............................................. G06F 11/00
[52] U.S. Cl. .................................. 371/11.1; 395/114; 395/166; 395/162; 395/164
[58] Field of Search .................... 371/11.1, 11.2, 15.1, 371/37.1, 7.1, 2.1; 365/200, 201; 395/113, 114, 164, 162, 166, 600

[56] References Cited
U.S. PATENT DOCUMENTS

| | | | |
|---|---|---|---|
| 4,809,214 | 2/1989 | Shimakura | 364/900 |
| 5,070,503 | 12/1991 | Shikakura | 371/2.1 |
| 5,093,831 | 3/1992 | Serizawa et al. | 371/37.1 |
| 5,129,058 | 7/1992 | Mifume et al. | 395/162 |
| 5,138,702 | 8/1992 | Tada | 395/275 |
| 5,150,462 | 9/1992 | Takeda et al. | 395/166 |
| 5,224,210 | 6/1993 | Pinedo et al. | 395/164 |

Primary Examiner—Robert W. Beausoliel, Jr.
Assistant Examiner—My-Phung Chung
Attorney, Agent, or Firm—Finnegan, Henderson, Farabow, Garrett & Dunner

[57] ABSTRACT

An image processing system including a reconfiguration circuit, typically responding to fault detection. The image processing includes a data compressing unit for compressing image data generated by an image input terminal, a data storage unit for storing output compressed image data, a data decompressing unit for decompressing compressed data and for transferring the decompressed data to an output terminal. A control unit controls the system to compress and store image data, and then to repeatedly read out and transfer the stored data to the image output terminal. When a self diagnosis detects a fault in any one of the compressing unit, data storage unit, or data decompressing unit, the faulty unit is bypassed with a special data bus, thereby allowing system operating to continue.

22 Claims, 3 Drawing Sheets

APPARATUS AND METHOD FOR RECONFIGURING AN IMAGE PROCESSING SYSTEM TO BYPASS HARDWARE

BACKGROUND OF THE INVENTION

1. Field of the Invention

The present invention relates generally to an image processing system, and more particularly, to an apparatus and method for reconfiguring an image processing system to bypass hardware, which may, for example, be faulty.

2. Field of the Related Art

In a conventional Recirculate Document Handler (RDH), a set of original documents are repeatedly read by an automatic image reader, and a required number of copies of the set of documents are produced. When the number of copies is large, the amount of mechanical handlings of the original documents is large, resulting in the possibility of damaged documents. In a proposed electronic RDH, a required number of copies are produced by reading in a proposed the image read only once. In the electronic RDH a data storage unit stores the read image data. It is desirable that the memory capacity of the storage unit be large. For this reason, a magnetic memory device, such as a hard disk, is preferred; although, a semiconductor memory may be used. To output a necessary number of copies, a set of original documents is read one time in the page order, and the read image data is stored into the storage unit. The image data stored is repeatedly read out of the storage unit in the page order, and transferred to the image output terminal, thereby producing a designated number of copies.

Since the image data contains an extremely large amount of information, the memory capacity of the storage unit must be extremely large in order to store the image information of multiple original documents. To alleviate the large storage requirements, the image data is applied to a compressor before storing compressed data in the storage unit, thereby conserving space in the storage unit. When the compressed data read is out of the storage unit, the compressed data is applied to a decompressor, which generates the data in its original uncompressed form. The uncompressed data is transferred to the image output terminal.

In the magnetic memory device, such as a hard disk, an average access time, including factors such as seek time, is approximately 1 M bytes/sec. A normal signal transfer time is 10 M bytes/sec. Thus, a speed gap exists between the access time and the transfer time. To address this speed gap problem, a page buffer is provided. The compressed data from the compressor is temporarily stored into the page buffer every page. After the storage of the image data into the hard disk is complete, the data is read out of the hard disk into the page buffer every page and then applied to the decompressor. The decompressed image data is transferred to the image output terminal.

In the image processing system described above, when there is a fault in one of either the compressor, page buffer, disk, or decompressor, the system becomes inoperable, even when the remaining components do not have faults.

SUMMARY OF THE INVENTION

It is an object of the present invention to provide an image processing system that will not necessarily be inoperative when there is a fault, or use in counter-indicated for, any of the compressor, page buffer, disk or decompressor.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve this object and other objects according to one aspect of the present invention an image processing system comprises image input means; means, responsive to the image input means, for compressing image data; means, responsive to the image input means, for bypassing the compressing means; means, responsive to the compressing means and to the compressing means bypassing means, for storing image data; means, responsive to the compressing means and to the compressing means bypassing means, for bypassing the storing means; means, responsive to the storing means and to the storing means bypassing means, for decompressing compressed image data including means for repeatedly reading an image stored in the storing means; and means, coupled to the means for repeatedly reading, for transferring decompressed image data to an image output terminal.

According to another aspect of the present invention in an image processing system having an image input means, an image processing method comprising the steps of: compressing image data received from the image input means; selectively bypassing the compressing step; storing image data; selectively bypassing the storing step; decompressing compressed image data including the substeps of repeatedly reading an image stored in the storing step transferring decompressed image data to an image output terminal.

The accompanying drawings, which are incorporated in and constitute a part of this specification, illustrate an implementation of the invention and, together with the description, serve to explain the object, advantages and principles of the invention.

DETAILED DESCRIPTION OF THE PREFERRED EMBODIMENTS

Figure 1:
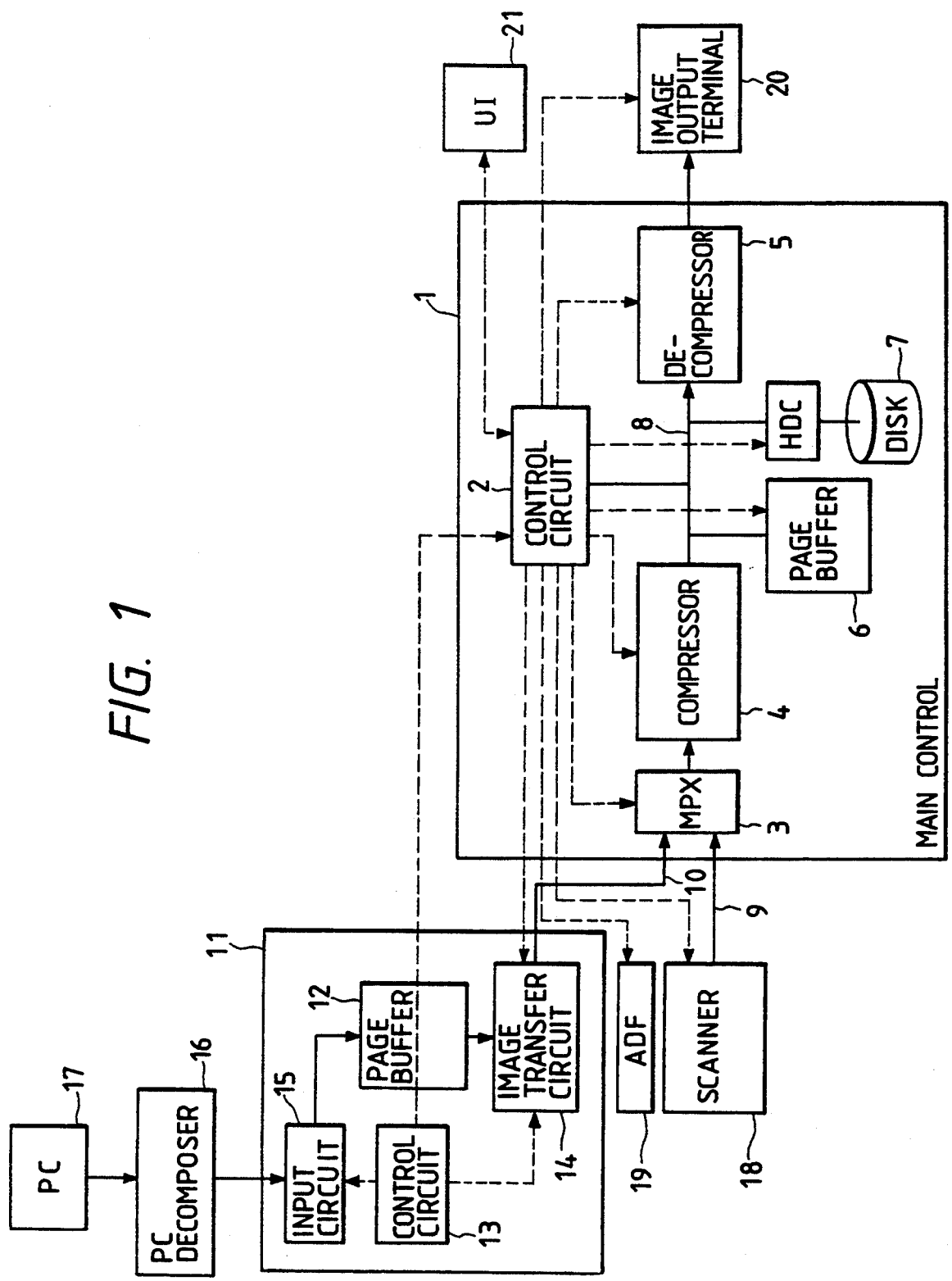
FIG. 1 is a block diagram showing an image processing system according to a preferred embodiment of the present invention.

FIG. 1 is a block diagram showing an embodiment of an image processing system according the present invention. In FIG. 1, a main control unit 1 includes a multiplexer (MPX) 3 for selecting image data from either an image input terminal (IIT), external devices such as a personal computer (PC), or facsimile (FAX). FIG. 1 also includes a compressor 4 for compressing image data, a decompressor 5 for decompressing the compressed image data into original image data, a page buffer 6, a disk 7 as a memory of large memory capacity, and a control circuit 2.

A scanner 18 is an image reader for reading an image on a document by using a CCD line sensor, for example. Scanner 12 has the following functions: offset and gain adjustments of the read signal, analog to digital conversion of image data, gap correction, shading correction, etc. When scanner 12 reads document images in a color mode, scanner 12 performs the following functions: gathering separated color image data, offset and gain adjustments of data signals, analog to digital conversion of the image signal, gap correction, shading correction, END (Equivalent Neutral Density conversion), color masking, document size detection, color change, UCR (Under Color Removal), black generation, mesh-dot removal, edge emphasis, TRC (Tone Reduction Control), enlargement/reduction, edit, and the like. An ADF (Automatic Document Feeder) 19 automatically feeds original documents to the system.

An image output terminal 20, such as a laser printer for example, reproduces a halftone image in the form of the collegation of mesh dots by controlling each pixel (picture element) by turning a laser beam on and off in accordance with two-level data as generated from the image data.

A PC 17 is a personal computer. A PC decomposer 16 develops the code data from the PC 17 into bit map data. An IOCP 11 is an external device controller made up of an input circuit 15 for PC image data, page buffer 12, image transfer circuit 14, and a control circuit 13. IOPC 11 reads the image data from page buffer 12 and then divides and distributes the data.

A user interface (U/I) 21 includes a display, a control panel, and the like. By using the U/I, a user enters various functions and edits, and views the present operating states of the system.

An arrangement of the main control unit 1 will be described.

Multiplexer 3 is provided for selectively connecting an image bus 8 to a scanner image bus 9 or an IOCP image bus 10.

Compressor 4, which is operates in either a compression mode or a bypass mode, compresses data by employing an adaptive prediction coding system. In the adaptive prediction coding system, the data pattern if predictor is compared with the image data every unit of pixel or pixels by a predictor. If no error occurs, "0" is assigned to the error data to execute run-length coding and the predictor is used continuously to compress the image data. On the other hand, if an error occurs, an error data code corresponding to the error data is assigned; and the predictor is changed to the next predictor to compare the image data. The compressed data is decompressed or expanded into the original image data by a decompressor 5 including plural kinds of reverse predictors which are used in a predetermined order.

Decompressor or expander 5, which is operable in either a decompression mode or a bypass mode, decompresses the compressed image data into the original data.

Page buffer 6 is capable of storing the image data of several document pages. Page buffer 6 temporarily stores the image data before it is written into disk 7 and after it is read out of disk 7. When the image data is subjected to edits, such as alter and replacement, under control of the control circuit 2, and is temporarily stored in page buffer 6, the data is not written into disk 7.

Disk 7 has a large storage capacity. Writing and reading of image data to and from disk 7 is controlled by a disk controller HDC.

The data to be stored in disk 7 are two-level and other multi-level image data, and code data, for example. The code data, which is not developed into bit map data, is transferred from IOCP image bus 10 through multiplexer 3 and compressor 4 to the system. In this case, compressor 4 is placed in the bypass mode. The bypass mode is also set up when the image data is straightforwardly generated, not through compressor 4 and decompressor 5.

Generally, in the fault detection/reconfiguration circuit for an image processing system, data compressing component, data storage component, and the data decompressing component are respectively provided with data buses through which signals bypass the corresponding component, respectively, and bus switching components for selectively switching the data buses. The image data signal can be made selectively to bypass the data compressing means, data storage means, and data decompressing means by controlling the bus switching means. Accordingly, the data compressing component, data storage component, and data decompressing component can be individually diagnosed by applying a specific diagnosis pattern from the input of the data compressing component into the component to be diagnosed. When the diagnosis reveals a fault in a component, of an other reason for bypassing the diagnosed component, the data signal is made to bypass that component and the image processing system continues to operate without that component.

The output operation of the image data as read by the scanner 18 will now be described in detail.

A case where images on a set of original documents are read and one copy is reproduced for each one sheet of document will first be described. Compressor 4 and decompressor 5 are placed in the bypass mode. Image data from scanner 18 is straightforwardly transferred from scanner bus 9 to image output terminal 20, avoiding multiplexer 3, compressor 4 and decompressor 5. Alternatively, compressor 4 and decompressor 5 are placed in the compression mode and the decompression mode, respectively. The compressed data is stored into disk 7 and transferred to decompressor 5 or is directly transferred to decompressor 5.

To produce multiple copies of original documents, compressor 4 and decompressor 5 are placed in the compression mode and the decompression mode, respectively. Image data from scanner 18 is compressed by compressor 4, and stored into disk 7. The image data is then read out of disk 7 a number of times equal to the designated number of copies in page order. Image data from disk 7 is decompressed by decompressor 5, and then transferred to image output terminal 20. Accordingly, multiple copies of the documents can be produced by a single mechanical image read operation. For the first copy, the image data may be stored into disk 7 and at the same time be decompressed by decompressor 5. This quickens the generation of the first copy, and reduces the time taken for the image reproduction.

For the operation from the image read to the image output, scanner 18 scans twice. The first scan is a prescan and the second scan is a main scan. After each of the two types of scans, scanner 18 must return to the start position as a return scan. The image data gathered through the main scan is transferred to a scanner image bus 9. However, the data as gathered through the prescan is not transferred to scanner image bus 9, because the data contains document size, mark for edits, area read, and the like, and is processed only within scanner 18. Accordingly, scanner image bus 9 is idle during the time periods of the prescan and the return scan.

As readily seen, the PC data can be processed during the period of time that scanner 18 is operating, if the image bus is switched from scanner image bus 9 to IOPC image bus 10 by multiplexer 3, during scan periods other than the image read time in the main scan, viz., the periods of the prescan and the scan return, and the rest of scanner 18. Further, in case where the multiple copies are produced as mentioned above, after scanner 18 reads the documents one time it is idle. During this period, however, the copy job is being executed, and the data is read out of disk 7 and the image output processing progresses. The image bus is busy also during this period.

When the code data comes in from PC 17 when scanner 18 reads an image in the main scan mode or when a copy job for the multiple copies is being executed, the code data is stored in page buffer 12 in IOCP 11 until the transfer of the code data is permitted. That is, the code data is not transferred until the bus is idle.

Where the amount of image data is increased to realize a high image quality, the scanner return time is short to completely transfer the image data of one page as stored in page buffer 12 of IOCP 11. To cope with this, it is desirable that the scanner data have higher priority than the PC data in the data processing. In other words, the PC data is processed after the processing of the scanner data is completed. A problem with this approach is that when a large amount of scanner image data is present, the PC data is not processed till the processing of the scanner image data is completed. A long time is taken for completing the processing of the large amount of scanner image data. During this time period, the subsequent scanner image data successively come in the image processing system, and overflow from page buffer 12.

In another possible approach, an interrupt is applied every scan, and the PC data is processed between the scans. The successive scans as in the conventional machine are impossible, and for the PC data processing the time adjustment is required between the scans. To be more exact, the scanner must additionally have a function to adjust the scan wait time.

Hence, if the PC data is divided into data segments each having such a data size as to be transferred within the carriage return time, the PC data can be transferred within the scanner return time, while retaining the successive scanner operation.

An outline of the operation of the PC data dividing method will be given.
1) PC decomposer 16 receives the code data from PC 17, and develops it into bit map data. IOCP 11 stores the bit map data into page buffer 12.
2) Control circuit 13 of IOCP 11 sends a signal to control circuit 2 in main control unit 1, and requests control circuit 2 to fetch the PC image data.
3A) At this time, if scanner 18 is not used, control circuit 2 drives multiplexer 3 to select IOCP image bus 10, and fetches the image data from page buffer 12 of IOCP 11. The image data is loaded into page buffer 6 by way of a route of image bus 10→multiplexer 3→compressor 4, and then is stored into disk 7. If image output terminal 20 is not used, control circuit 2 reads the image data from disk 7, and transfers the data to image output terminal 20, through page buffer 6 and decompressor 5.
3B) If scanner 18 is used, the control circuit allows the scanner operation, and at the completion of the image read by scanner 18, instructs ADF 19 to change the document. Further, the control circuit sends a signal to IOCP 11 permitting it to transfer the divided image signal. Then, the control circuit sets multiplexer 3 to image bus 10. The first half image data is read out of page buffer 12, and transferred through image bus 10. Then, the image data is stored into disk 7 by way of a route of multiplexer 3→compressor 4→page buffer 6, under control of control circuit 2. The above sequence of operations is repeated for the second half image data.
4) As the scan image data has been transferred to the image output terminal 20, the control circuit 2 reads the PC image data out of the disk 7 and loads it into the page buffer 6, and then transfers it to the image output terminal 20.

The self-diagnosis function and the bypass function according to the preferred embodiment of the present invention will be described.

Figure 2:
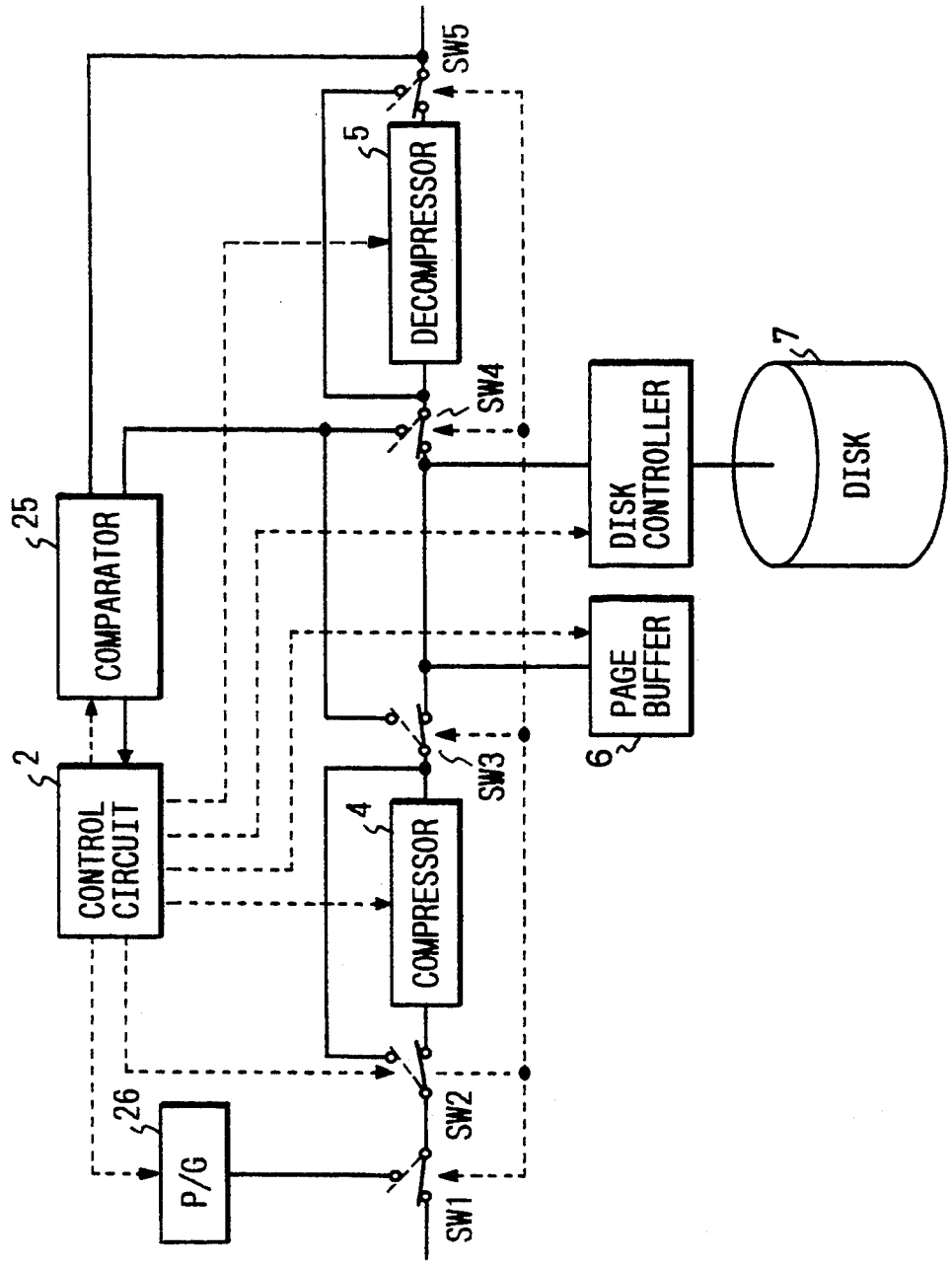
FIG. 2 is a block diagram showing a fault detection/reconfiguration circuit for an image processing system according to the preferred embodiment of the present invention.
Figure 4:
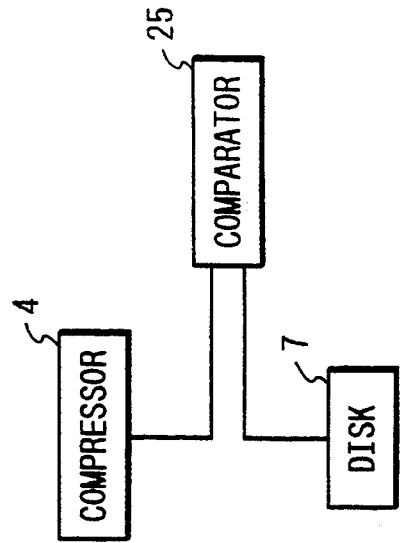
FIG. 4 is a block diagram showing a configuration of a diagnosis circuit for a compressor and a disk.
Figure 3:
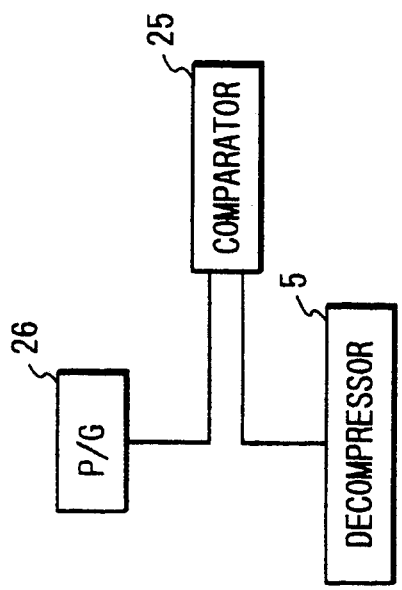
FIG. 3 is a block diagram showing a configuration of a diagnosis circuit for a decompressor.

FIG. 2 is a block diagram showing a fault detection/reconfiguration circuit for an image processing system according to the preferred embodiment of the present invention. FIG. 3 is a block diagram showing an arrangement of a diagnosis circuit for a decompressor. FIG. 4 is a block diagram showing an arrangement of a diagnosis circuit for a compressor and a disk.

To perform a self-diagnosis of the image processing system, a comparator 25 and a pattern generator 26 are coupled with control circuit 2, as shown in FIG. 2. Further, compressor 4, page buffer 6, and disk 7 make up a data storage section.

Switch SW1 has a fixed contact coupled to the fixed contact of a switch SW2 and a switchable contact selectively coupled to either an image input source or to the output of pattern generator 26. Switch SW2 has a fixed contact and a switchable contact selectively coupled to either the input of compressor 4 or to the output of the compressor 4. Switch SW3 has a fixed contact coupled to the output of compressor 4 and a switching contact selectively coupled to either an input of comparator 25 or to the disk 7. Switch SW4 has a fixed contact coupled to the input of decompressor 5 and a switching contact selectively coupled to either the first input of comparator 25 of to disk 7. Switch SW5 has a fixed contact and a switchable contact selectively coupled to either the output of decompressor 5 or to the input of decompressor 5.

Switches SW2 to SW5 for bypassing decompressor 5 make up a bypass circuit. The switch SW1 selects either the image data or the output signal of pattern generator 26. Comparator 25 compares data read from disk 7, and routed through a bypass circuit, with data generated by decompressor 5, to verify that disk 7 generates the same serial data as decompressor 5.

In the self diagnosis function of main control unit 1, control circuit 2 controls the switch positions of the switches SW1 to SW5, and checks whether compressor 4, page buffer 6, disk 7 and decompressor 5 operate normally or with faults on the basis of the normal fault signal from comparator 25, and transfers the diagnosis result to a user through UI 21. To this end, pattern generator 26 generates diagnosis pattern data. Disk 7 stores compressed diagnosis data corresponding to the diagnosis pattern data.

When control circuit 2 detects a fault in compressor 4, control circuit 2 cause compressor 4 to be bypassed. To detect a fault in compressor 4, control circuit 2 enables compressor 4 to to apply data to the comparator 25, enables the pattern generator 26 to apply data to the compressor 4, and also enables the disk 7 to apply data to the comparator 25.

FIG. 4 is a data flow diagram for diagnosing compressor 4. To diagnose compressor 4, switches SW1, and SW3 are turned to the up positions and switch SW2 is turned to the down position (see FIG. 2). With the switches in this configuration, comparator 25 compares the pattern data that is generated by the pattern generator 26 and compressed by compressor 4, with the compressed diagnosis data stored in the disk 7 (see FIG. 4). When compressor 4 normally operates, the comparator produces a good signal. When something is wrong with compressor 4, or any other reason is found for bypassing it, the comparator 4 produces a fault signal.

When control circuit 2 detects a fault in decompressor 5, control circuit 2 cause decompressor 5 to be bypassed. To detect a fault in decompressor 5, control circuit 2 enables pattern generator 26 to apply data to the comparator, and enables decompressor 5 to apply data to the comparator.

FIG. 3 is a data flow diagram for diagnosing decompressor 5. To diagnose decompressor 5, switches SW1 to SW3 are turned to positions as indicated by dotted lines. With the switches in this configuration, comparator 25 compares the pattern data that is generated by pattern generator 26 and compressed by compressor 4, with diagnosis data resulting from decompressing the compressed diagnosis data as stored in disk 7 (see FIG. 3). When decompressor 5 normally operates, comparator produces a good signal. When something is wrong with the compressor 4, the comparator produces a fault signal.

When control circuit 2 detects a fault in page buffer 6 or disk, control circuit 2 causes page buffer 6 and disk 7 to be to be bypassed. To detect a fault in either page buffer 6 or disk 7, control circuit 2 enables pattern generator 26 to write pattern data into either page buffer 6 or disk 7 by controlling the decompressor 5 bypass bus to enable page buffer 6 or disk 7 to apply data to comparator 25, and by controlling the compressor bypass bus to enable pattern generator 26 to apply data to the comparing means.

Figure 5:
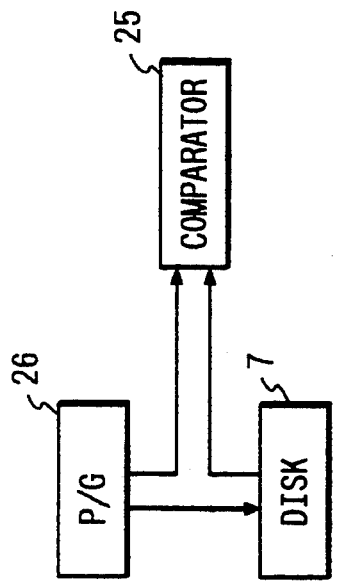
FIG. 5 is a block diagram showing a configuration of a diagnosis circuit for a disk.

FIG. 5 is a data flow diagram for diagnosing page buffer 5 or disk 7. To diagnose page buffer 5 or disk 7, the switch SW1 and SW2 are turned to the up position, and the switch SW3 is turned to the down position (see FIG. 2). With this switch configuration, pattern data generated by pattern generator 26 and stored into the page buffer 6 or disk 7. Then, the switches SW1, SW2, SW3, and SW5 are turned to the up position, and the switch SW4 is turned to the down position. With the switches in this configuration comparator 25 compares the pattern data generated by pattern generator 26 with the pattern data stored in page buffer 6 or disk 7. When page buffer 6 or disk 7 normally operates, the comparator produces a good signal. When something is wrong with compressor 4, the comparator produces an fault signal signal.

When the self-diagnosis reveals a fault in compressor 4 or decompressor 5, the switches SW2 and SW5 are turned to the positions of the dotted lines. The image data is directly stored bypassing compressor 4, and transferred to image output terminal 20 bypassing decompressor 5.

When the self-diagnosis reveals a fault in page buffer 6 or disk 7, the switches SW2 to SW5 are turned to the positions of the dotted lines. The image data is directly transferred to image output terminal 20 bypassing compressor 4, decompressor 5, page buffer 6, and disk 7.

It should be understood that the present invention is not limited to the above-mentioned embodiment, but may variously be modified, altered and changed within the scope of the invention. In the embodiment, on the basis of the self-check result, control circuit 2 automatically switches SW2 to SW5 to form the bypass circuit. If required, a user may control the bypass circuit irrespective of occurrence of a fault. One of the input terminals of comparator 25, which is coupled with the bus bypassing page buffer 6 and disk 7 in the embodiment, may be connected to the bus connecting to the output of compressor 4.

As seen from the foregoing description, the image processing system according to the preferred embodiment of the present invention has the bypass function and the self-check function. With the functions, if a fault occurs in the compressor, decompressor, page buffer and disk in the main control unit, the copying function of the image processing system is uninterruptedly operable. Further, if a fault occurs in the compressor and the decompressor, the function based on the data storage by the disk can be used.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of applicant's general inventive concept.

What is claimed is:

1. An image processing system for coupling to an image output terminal, the system comprising:
    means for storing image data;
    image input means for generating an image signal;
    means for compressing the image signal to generate a compressed image signal and to send the compressed image signal to the storing means;
    first bypassing means, responsive to the image input means, for selectively bypassing the compressing means, the first by-passing means including means for selectively inhibiting the compressing means from sending the compressed image signal to the storing means, and for sending the image signal to the storing means; and
    means, responsive to the storing means, for processing image data and including
        means for repeatedly reading an image stored in the storing means, and
        means, coupled to the means for repeatedly reading, for transferring the image to the image output terminal.

2. The system according to claim 1, further including means for generating a pattern,
    means, having a first input responsive to the pattern generating means and a second input responsive to the compressing means, for comparing a signal on the first input to a signal on the second input to control the first bypassing means.

3. The system according to claim 2, further including first detecting means for detecting a fault in the storing means;

second bypassing means, responsive to the first detecting means, for bypassing the storing means, when the first detecting means detects a fault in the storing means.

4. The system according to claim 3, further including means for enabling the pattern generating means to write pattern data into the storing means; and means for controlling the first bypassing means to enable the pattern generating means to apply data to the comparing means.

5. The system according to claim 4, further including means, responsive to the first detecting means, for activating the first bypassing means, when the first detecting means detects a fault in the storing means.

6. The system according to claim 3, wherein the second bypassing means includes a first switch means having a fixed contact coupled to the compressing means and a switching contact selectively coupled to one of the first input of the comparing means and the storing means; and a second switch means having a fixed contact coupled to the decompressing means and a switching contact selectively coupled to one of the first input of the comparing means and the storing means.

7. The system according to claim 2, further including means for enabling the compressing means to apply data to the comparing means and for enabling the pattern generating means to apply data to the compressing means; and means for enabling the storing means to apply data to the comparing means.

8. The system according to claim 2, further including means for enabling the pattern generating means to apply data to the comparator; and means for enabling the processing means to apply data to the comparing and enabling the storing means to apply data to the comparing means.

9. The system according to claim 2, further including switch means having a switchable contact selectively coupled to one of the image input means and the output of the pattern generating means.

10. The system according to claim 1, further including first detecting means for detecting a fault in the compressing means;

means for activating the first bypassing means, when the first detecting means detects a fault in the compressing means.

11. The system according to claim 1, wherein the first bypassing means includes switch means having a fixed contact and a switchable contact selectively coupled to one of the input of the compressing means and the output of the compressing means.

12. The system according to claim 1, further including switch means having a fixed contact and a switchable contact selectively coupled to one of the processing means and the storing means.

13. The system according to claim 1, wherein the transferring means includes means for decompressing compressed image data, and wherein the system further includes means for detecting a fault in the decompressing means; and means, responsive to the means for detecting a fault in the decompressing means, for activating the first bypassing means.

14. In an image processing system having an image input means for generating an image signal, and a means for storing image data, an image processing method comprising the steps of:

compressing the image signal to generate a compressed image signal and to send the compressed image signal to the storing means;

selectively bypassing the compressing step, including the substeps of selectively inhibiting the compressing step from sending to the storing means, and sending the image signal to the storing means;

storing data;

selectively bypassing the storing step; and processing image data including the substeps of repeatedly reading an image stored in the storing step, and transferring the image to an image output terminal.

15. The method according to claim 14, further including the steps of generating a pattern; and comparing data from the generating step with data stored in the storing step.

16. The method according to claim 15, further including the steps of testing the storing step to determine whether or not there is a fault in the storing step;

bypassing the storing step when a fault is detected by the testing step.

17. The method according to claim 16, further including the step of activating the bypassing compressing step when the first detecting step detects a fault in the storing step.

18. The method according to claim 15, further including the steps of enabling the pattern generating step to apply data to the compressing step; and enabling the storing step to apply data to the comparing step.

19. The system according to claim 15, further including the step of enabling the storing step to apply data to the comparing step.

20. The method according to claim 14, further including the steps of generating pattern data; and comparing data from the pattern generating step with data from the storing step.

21. The method according to claim 14, further including the steps of detecting a fault in the compressing step;

activating the bypassing compressing step when the detecting step detects a fault in the compressing step.

22. The method of according to claim 14, wherein the transferring step further includes a substep of decompressing, and wherein the method further includes the steps of testing the storing step to determine whether or not there is a fault in the decompressing substep;

activating the bypassing compressing step when the step of detecting a fault in the compressing step detects a fault.

* * * * *

UNITED STATES PATENT AND TRADEMARK OFFICE
CERTIFICATE OF CORRECTION

PATENT NO. : 5,337,319
DATED : August 09, 1994
INVENTOR(S) : Shigehiro Furukawa et al.

It is certified that error appears in the above-indentified patent and that said Letters Patent is hereby corrected as shown below:

Claim 8, column 9, line 40, after "comparing" insert --means--

Signed and Sealed this

Twenty-fifth Day of April, 1995

Attest:

BRUCE LEHMAN

*Attesting Officer*            *Commissioner of Patents and Trademarks*

UNITED STATES PATENT AND TRADEMARK OFFICE
CERTIFICATE OF CORRECTION

PATENT NO. : 5,337,319

DATED : August 9, 1994

INVENTOR(S) : Shigehiro Furukawa et al.

It is certified that error appears in the above-identified patent and that said Letters Patent is hereby corrected as shown below:

Claim 6, column 9, line 26, "decompressing" should read --processing--.

Signed and Sealed this

Ninth Day of July, 1996

Attest:

BRUCE LEHMAN

*Attesting Officer*    Commissioner of Patents and Trademarks